(12) United States Patent
Picciallo

(10) Patent No.: US 10,382,542 B2
(45) Date of Patent: Aug. 13, 2019

(54) ELECTRONIC DEVICE WITH CALENDARING CAPABILITIES

(71) Applicant: Michael J. Picciallo, Dover, NJ (US)

(72) Inventor: Michael J. Picciallo, Dover, NJ (US)

(*) Notice: Subject to any disclaimer, the term of this patent is extended or adjusted under 35 U.S.C. 154(b) by 158 days.

(21) Appl. No.: 15/001,469

(22) Filed: Jan. 20, 2016

(65) Prior Publication Data
US 2016/0212210 A1    Jul. 21, 2016

Related U.S. Application Data

(60) Provisional application No. 62/105,404, filed on Jan. 20, 2015.

(51) Int. Cl.
*H04L 29/08* (2006.01)
*G06F 16/2455* (2019.01)
*G06Q 10/10* (2012.01)

(52) U.S. Cl.
CPC .... *H04L 67/1095* (2013.01); *G06F 16/24565* (2019.01); *G06Q 10/109* (2013.01); *H04L 29/08* (2013.01)

(58) Field of Classification Search
None
See application file for complete search history.

(56) References Cited

U.S. PATENT DOCUMENTS

| | | | | |
|---|---|---|---|---|
| 2007/0130221 A1* | 6/2007 | Abdo | ............... | G06F 21/6227 |
| 2010/0162105 A1* | 6/2010 | Beebe | ............... | G06Q 10/109 |
| | | | | 715/273 |
| 2010/0180212 A1* | 7/2010 | Gingras | ............... | G06Q 10/109 |
| | | | | 715/751 |
| 2014/0082099 A1* | 3/2014 | Burns | ............... | H04L 67/26 |
| | | | | 709/206 |
| 2014/0237380 A1* | 8/2014 | Kurrus | ............... | H04L 65/403 |
| | | | | 715/752 |
| 2015/0172330 A1* | 6/2015 | Kaplan | ............... | H04L 65/403 |
| | | | | 709/206 |

* cited by examiner

*Primary Examiner* — Viet D Vu
*Assistant Examiner* — James A Edwards
(74) *Attorney, Agent, or Firm* — Fox Rothschild LLP

(57) ABSTRACT

Systems and methods for providing an Electronic Calendar ("EC"). The methods comprise: generating a first EC by a first Electronic Device ("ED") used by a first person; performing network-based communication operations between the first ED and a second ED to obtain first Calendar Information ("CI") associated with a second EC maintained by the second ED that is used by a second person and remote from the first ED; performing operations by the first ED to select a first Scheduled Event ("SE") specified by the first CI based on a first pre-defined criteria; generating second CI by modifying a portion of the first CI associated with the first SE which was previously selected to comply with a second pre-defined criteria that is different than the first pre-defined criteria; and transforming the first EC into a consolidated EC by merging the second CI with third CI associated with the first EC.

20 Claims, 15 Drawing Sheets

FIG. 19
FIG. 20
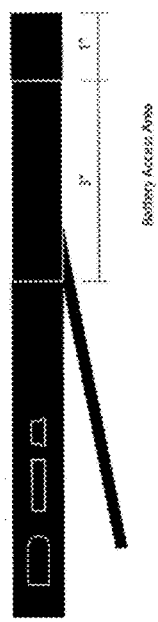 
FIG. 21    FIG. 22

ELECTRONIC DEVICE WITH CALENDARING CAPABILITIES

CROSS-REFERENCE TO RELATED APPLICATIONS

This application claims priority to U.S. Patent Application No. 62/105,404, filed Jan. 20, 2015. The content of the above application is incorporated by reference in its entirety.

FIELD OF THE INVENTION

This document relates generally to electronic devices. More particularly, this document relates to electronic devices with calendaring capabilities.

BACKGROUND OF THE INVENTION

Electronic calendars are well known in the art. Such electronic calendars run calendaring software. The calendaring software is operative to provide an appointment book, address book, and/or contact list. As such, the electronic calendars contain one or more of the following features: a calendar; an address book; appointment attachments; appointment calendar; appointment reminders; availability sharing; calendar publishing; calendar exporting; collaborative scheduling; customization; e-mail; group calendar; multiple calendar; and multi-viewing; printing. Each of the listed features is well known in the art, and therefore will not be described herein.

SUMMARY OF THE INVENTION

The present disclosure concerns systems and methods for providing an electronic calendar through network-based communications between at least two network nodes. The methods involve: generating a first electronic calendar by a first electronic device used by a first person; and performing network-based communication operations between the first electronic device and a second electronic device to obtain first calendar information associated with a second electronic calendar maintained by the second electronic device. In some cases, the second electronic device is (a) used by a second person selected from a plurality of people that are exclusive of the first person and (b) remote from the first electronic device.

Next, the first electronic device selects at least one first scheduled event specified by the first calendar information based on first pre-defined criteria. The first pre-defined criteria can include, but is not limited to, at least one of a team name, a group name, a grade level, an instructors name, a class name, an entity name, a location name, a person's name, a meeting name or topic, a presentation name or topic, a phone number, a date range, a time range, an event name, an event type, and a person's appointment history.

The first scheduled event is then used by the first electronic device to generate second calendar information. The second calendar information is generated by modifying a portion of the first calendar information associated with the first scheduled event which was previously selected to comply with second pre-defined criteria that is different than the first pre-defined criteria. The second pre-defined criteria can include, but is not limited to, the user's preferences for viewing the first electronic calendar. Thereafter, the first electronic calendar is transformed, by the first electronic device, into a consolidated electronic calendar by merging the second calendar information with third calendar information associated with the first electronic calendar. For example, the merging may comprise adding the first scheduled event to the first electronic calendar.

In some scenarios, a second iteration of the network-based communication operations, selecting, generating and transforming is performed by the first electronic device in response to an occurrence of a trigger event. The trigger event can include, but is not limited to, an expiration of a time period, an occurrence of a particular scheduled event contained in the consolidated electronic calendar, or a modification of the consolidated electronic calendar in accordance with content of a third electronic calendar maintained by a third electronic device. The third electronic device is used by a third person other than the first and second person. Each of the first, second and/or third electronic calendars can be a personal calendar and/or a business entity's calendar (e.g., a movie theater's calendar or a sport arena's calendar).

In those or other scenarios, the methods further involve: analyzing, by the first electronic device, the consolidated electronic calendar to identify any duplicative scheduled events thereof; and deleting the duplicative scheduled events from the consolidated electronic calendar prior to presenting the consolidated electronic calendar to the first person.

In those or yet other scenarios, the portion of the first calendar information is modified so that an alarm issued a certain amount of time prior to the occurrence of the first scheduled event is different than an alarm issued a certain amount of time prior to a second scheduled event specified on the first electronic calendar. Alternatively or additionally, the content displayed on the first electronic calendar is automatically changed in response to a trigger event. The trigger event can include, but is not limited to, a modification of a scheduled event on the second electronic calendar.

DESCRIPTION OF THE DRAWINGS

Embodiments will be described with reference to the following drawing figures, in which like numerals represent like items throughout the figures, and in which:

FIG. 19 is a bottom view of the electronic device shown in FIG. 17.

FIG. 20 is a top view of the electronic device shown in FIG. 17.

FIG. 21 is a right side view of the electronic device shown in FIG. 17.

FIG. 22 is a left side view of the electronic device shown in FIG. 17.

DETAILED DESCRIPTION

Figure 1:
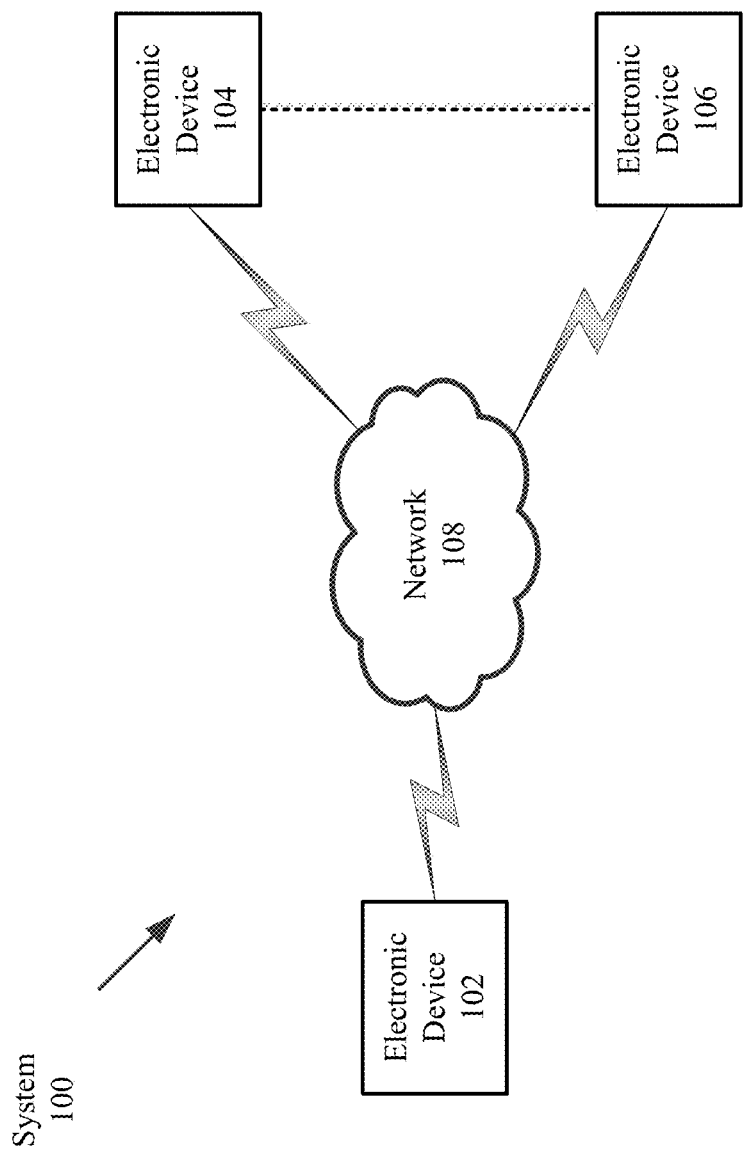
FIG. 1 is a schematic illustration of an exemplary system/

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Exemplary embodiments of the present invention will now be described with respect to FIGS. 1-27. The present disclosure generally relates to novel systems and methods for providing an electronic device that is operative to act as an electronic calendar, alarm clock, appointment holder, and/or picture display. The electronic device has a structural component for facilitating mounting on a desktop (as shown in FIGS. 16-21) or a wall (not shown). The electronic device also comprises hardware and software facilitating the provision of various calendaring, alarming, and imaging functions to a user thereof.

Referring to FIG. 1, a schematic illustration is provided of an exemplary system 100 in which a plurality of electronic devices 102, 104, 106 operate. Each electronic device comprises a personal computer, a laptop, a smart phone, a cellular phone, a personal digital assistant or any other computing device that is capable of providing an electronic calendar. During operations, the electronic devices 102, 104, 106 communicate with each other via a network 108 (e.g., an Intranet or Internet). The communication can be a wired communication or a wireless communication. Such communications can be performed to exchange calendar information associated with calendars respectively provided by the electronic devices 102, 104, 106. The calendar information can include, but is not limited to, information specifying at least one scheduled event (e.g., a meeting, a sporting event, a concert, etc.).

Figure 2:
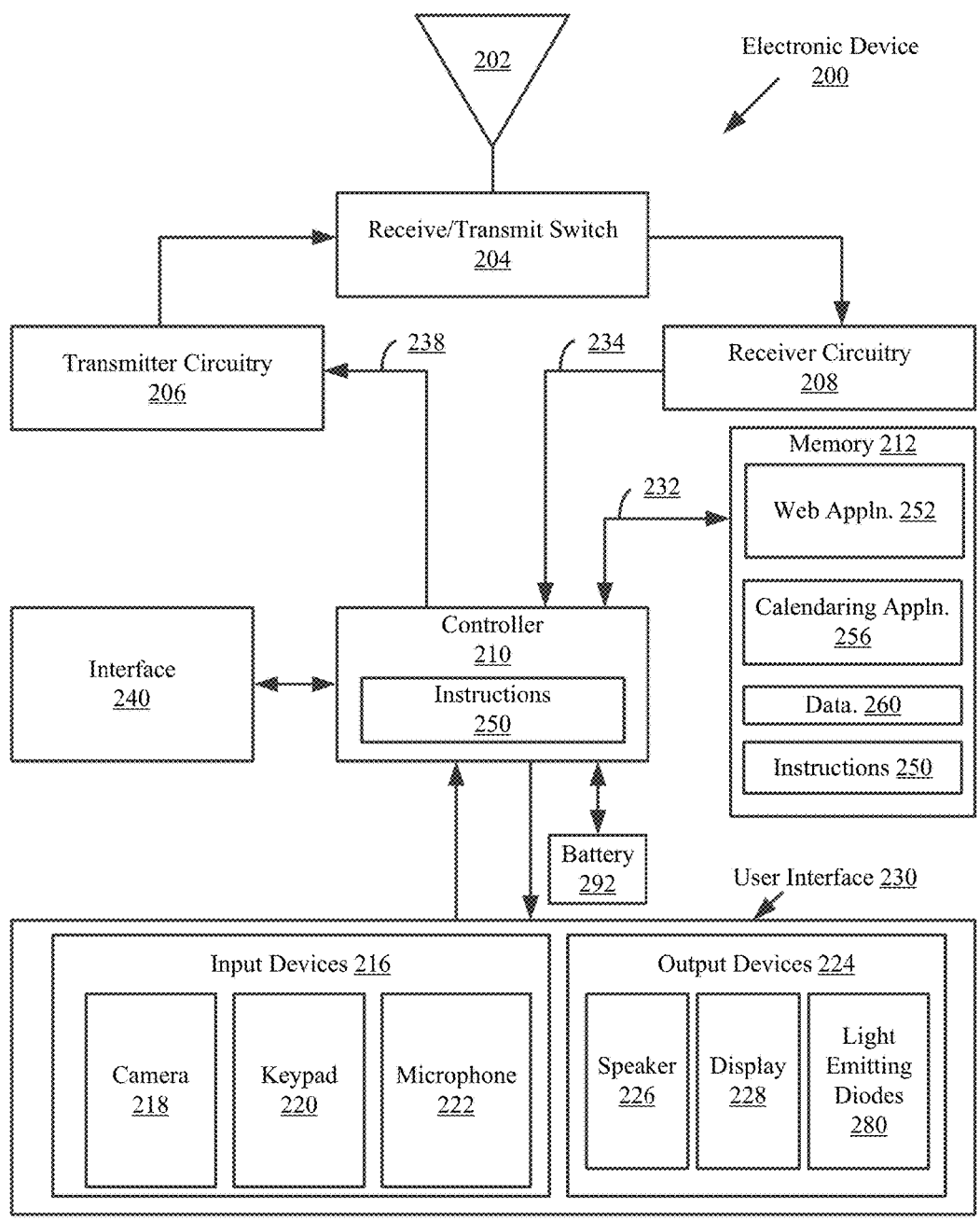
FIG. 2 is a schematic illustration of an exemplary architecture for an electronic device.

Referring now to FIG. 2, there is provided an exemplary architecture for an electronic device 200. The electronic devices 102, 104, 106 of FIG. 1 are the same as or substantially similar to the electronic device 200. As such, the description of electronic device 200 is sufficient for understanding electronic devices 102, 104, 106.

The electronic device 200 may include more or less components than those shown in FIG. 1. However, the components shown are sufficient to disclose an illustrative embodiment implementing the present invention. Some or all of the components of the electronic device 200 can be implemented in hardware, software and/or a combination of hardware and software. The hardware includes, but is not limited to, one or more electronic circuits.

The electronic device 200 generally comprises a computing device with communications capabilities such that various web-based services can be provided to users thereof. In this regard, the electronic device 200 comprises wired and wireless communication components. The wired communication components include, but are not limited to, an interface 240 (e.g., an Ethernet port) for coupling the electronic component to an external device, such as an Internet router or a gaming console. The interface 240 may also comprise a Universal Serial Bus ("USB") port.

The wireless communication components comprise an antenna 202 for receiving and transmitting wireless signals. A receive/transmit ("Rx/Tx") switch 204 selectively couples the antenna 202 to the transmitter circuitry 206 and the receiver circuitry 208 in a manner familiar to those skilled in the art. The receiver circuitry 208 demodulates and decodes the wireless signals received from an external device. The receiver circuitry 208 is coupled to a controller (or microprocessor) 210 via an electrical connection 234. The receiver circuitry 208 provides the decoded signal information to the controller 210. The controller 210 uses the decoded wireless signal information in accordance with the function(s) of the electronic device 200. The controller 210 also provides information to the transmitter circuitry 206 for encoding and modulating information into wireless signals. Accordingly, the controller 210 is coupled to the transmitter circuitry 206 via an electrical connection 238. The transmitter circuitry 206 communicates the wireless signals to the antenna 202 for transmission to an external device via the Rx/Tx switch 204.

The controller 210 may store received and extracted information in memory 212 of the electronic device 200. Accordingly, the memory 212 is connected to and accessible by the controller 210 through electrical connection 232. The memory 212 may be a volatile memory and/or a non-volatile memory. For example, memory 212 can include, but is not limited to, a Random Access Memory ("RAM"), a Dynamic RAM ("DRAM"), a Read Only Memory ("ROM") and a flash memory. The memory 112 may also comprise unsecure memory and/or secure memory. The memory 212 can be used to store various other types of data 260 therein, such as authentication information, cryptographic information, location information, and various calendaring-related information.

As shown in FIG. 2, one or more sets of instructions 250 are stored in memory 212. The instructions may include customizable instructions and non-customizable instructions. The instructions 250 can also reside, completely or at least partially, within the controller 210 during execution thereof by the electronic device 200. In this regard, the memory 212 and the controller 210 can constitute machine-readable media. The term "machine-readable media", as used herein, refers to a single medium or multiple media that stores one or more sets of instructions 250. The term "machine-readable media", as used here, also refers to any medium that is capable of storing, encoding or carrying the set of instructions 250 for execution by the electronic device 200 and that causes the electronic device 200 to perform one or more of the methodologies of the present disclosure.

The controller 210 is also connected to a user interface 230. The user interface 230 comprises input devices 216, output devices 224 and software routines (not shown in FIG. 2) configured to allow a user to interact with and control software applications (e.g., software applications 252, 256 and other software applications) installed on the electronic device 200. Such input and output devices may include, but are not limited to, a display 228, a speaker 226, a keypad 220, a directional pad (not shown in FIG. 2), a directional knob (not shown in FIG. 2), and a microphone 222. The display 228 may be designed to accept touch screen inputs. As such, user interface 230 can facilitate a user software interaction for launching applications (e.g., software applications 252, 256 and other software applications) installed on the electronic device 200. The user interface 230 can facilitate a user-software interactive session for capturing, storing, and calendaring appointments.

The display 228, keypad 220, directional pad (not shown in FIG. 2) and directional knob (not shown in FIG. 2) can collectively provide a user with a means to initiate one or more software applications or functions of the electronic device 200. The application software 252, 256 can facilitate the calendaring of appointments, as well as the communication with a server (not shown) located at a remote site. Communications between the electronic device 200 and the remote server can be achieved via a network (e.g., the Internet). As such, the electronic device 200 has a web application 252 installed thereon to facilitate such network communications and/or the provision of web-based services to a user thereof. The web-based services can include, but are not limited to, providing access to a calendar and/or digital image generated using the electronic device 200 via a public network. In effect, a user can communicatively connect a plurality of other electronic devices (e.g., a personal computer and/or a smart phone) to a web-based service such that the user can view his(her) calendar and/or digital images on other devices remote from the electronic device 200 at any given time. The user may also be able to control one or more operations of the electronic device 200 via another remote electronic device (e.g., set or change alarm and/or appointment parameters).

The network communications also allow the electronic device 200 to exchange information with a plurality of other electronic devices of one or more particular persons. For example, the electronic device 200 may exchange calendar information with a person's mobile phone or personal computer via the Internet. The exchange of the calendar information ensures that: the electronic device 200 presents information reflecting any calendar updates made to other electronic calendars (e.g., an Outlook calendar or a smartphone calendar) by the person or other persons; and the other calendars present information reflecting any calendar updates made to the calendar of the electronic device 200 by the person or other person.

The person can make a change to the calendar via the touch screen 228, a keypad 220 and/or voice recognition component (not shown) of the electronic device 200. User authentication may be required for making a change to the calendar (e.g., adding or deleting an appointment, or setting or changing alarm/reminder parameters). Any known or to be known technique for providing user authentication can be used herein without limitation. For example, a username and password based technique can be employed for user authentication.

The electronic device 200 can be used by the person to subscribe or obtain access to one or more other person's or entity's calendar. For example, the person may subscribe to a school's calendar, an event hall's calendar and/or a sports team calendar. In effect, these other calendars can be separately viewed on the electronic device 200. Prior to viewing by the user of the electronic device 200, these other calendars may be modified so as to comply with the user's preferences for viewing calendars.

Additionally or alternatively, the events scheduled on these other calendars may appear on the person's own electronic calendar. Stated differently, the contents of two or more electronic calendars can be merged together so as to form one consolidated calendar. If the same appointment exits on two or more calendars, then only one instance thereof will exist in the consolidated calendar. In some cases, the person may be prompted to accept or decline an event scheduled or attempting to be scheduled by another person or entity on his(her) personal calendar and/or consolidated calendar. Also, the personal calendar and/or consolidated calendar may be auto-populated based on the person's appointment history and/or other criteria. In this scenario, only select appointments existing in a given one of the two or more calendars can be used to dynamically populate the consolidated calendar (or dynamically modify the person's own electronic calendar). The other criteria can include, but is not limited to, a team name, a group name, a grade level, an instructors name, a class name, an entity name, a location name, a person's name, a meeting name or topic, a presentation name or topic, a phone number, a date range, a time range, an event name, and an event type.

The electronic device 200 can have pre-configured or user-configured alarms for indicating that a scheduled event is to occur in a given amount of time. The alarm can include, but is not limited to, an auditory alarm, a visual alarm and/or a tactile alarm. The alarm can be the same or different for each type of event, each person associated with scheduled events and/or entities associated with scheduled events. The alarms can be output one or more times for a given appointment. For example, a first alarm is issued ten minutes before an event is to occur. Thereafter, a second alarm is issued five (5) minutes before the event is to occur. The first and second alarms can be of the same or different types, and/or of the same or different volumes/intensities.

The electronic device 500 can present information to a user thereof in any language and/or in accordance with any time zone. The language and/or time zones can be pre-configured or user-configured. As such, a menu can be made available to the user for selecting a language from a plurality of listed languages and/or a time zone from a plurality of time zones.

Additionally, the user may be able to select a desired electronic frame and/or background image for the calendar from a plurality of pre-stored electronic frames/images. Additional electronic frames and/or background images can be purchased from an online store to which the electronic device 500 can connect. Certain electronic frames/background images can be automatically selected for the user based on his(her) geographic location, interests, hobbies, profession, and/or shopping history. The electronic frames/background images can have any theme selected in accordance with a particular application. Such themes include, but are not limited to, an animal theme, a sports team theme, a nature theme, and a city theme.

In some cases, the user may be able to capture an image using a camera 218 of the electronic device 200, which can optionally be used as a background image of the calendar and/or shared with other people. These images may be stored on the electronic device 200 and/or at a remotely located database (e.g., in the cloud). Other images captured by other electronic devices can also be downloaded to the electronic device 200 for use thereon. For example, pictures from another electronic device can be downloaded to the electronic device 200, and posted on a calendar thereof as a gift (similar to posting an appointment). Likewise, images captured by the camera 218 of the electronic device 200 can be downloaded onto other remotely located electronic devices. A fee may be charged for gaining access to and/or downloading these pictures.

The electronic device 200 can maintain calendar information for a pre-defined period of time or a user-specified period of time. For example, calendar information may be erased from the electronic calendar upon the expiration of a defined number of days, week, months, or years from respective event dates.

The electronic device 200 can operate in a sleep mode for purposes of saving battery power. A person may perform user-software interactions with the electronic device 200 to place it in its sleep mode. Alternatively or additionally, the electronic device 200 can enter its sleep mode automatically upon the occurrence of a particular event or the absence of any event for a given period of time. The electronic device 200 may be manually transitioned from its sleep mode simply by touching the display 228 thereof, and/or automatically transitioned from its sleep mode when a scheduled event is to occur in a certain amount of time (e.g., 15 minutes, 30 minutes, 45 minutes, 1 hour, etc. . . . ). When the electronic device 200 transitions from its sleep mode, the display 228 lights up such that a person can view the electronic calendar and/or other information.

In some scenarios, the electronic device 200 can automatically change its displayed content in response to certain trigger events. For example, the content of the display 228 can be automatically switched between calendar information, date/time information, weather information, and/or rotating pictures in response to the occurrence of a trigger event. The trigger event can include, but is not limited to, an expiration of a time period, issuance of a scheduled event reminder, and/or an invitation to accept/decline a new proposed scheduled event.

Figure 3:
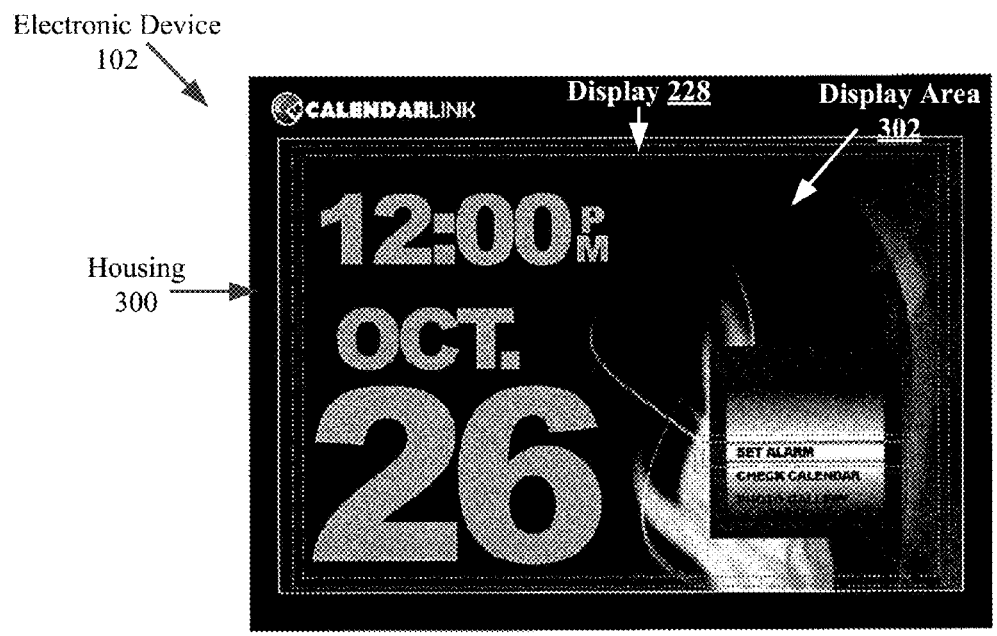
FIGS. 3-16 each provide a schematic illustration that is useful for understanding how operations of an electronic device implementing the present invention are controlled by a user.

The electronic device 200 can have any form factor selected in accordance with a particular application. An exemplary architecture of the electronic device 200 is provided in FIG. 3. As shown in FIG. 3, a housing 300 of the electronic device 200 can have a generally rectangular shape with certain dimensions (e.g., 12 inches wide, 9 inches tall and ⅜ inches thick). The housing 300 of the electronic device 200 can be made from any suitable material, such as recycled plastic.

A display area 302 is provided on the display 228 of the electronic device 200. The display area 202 can have any number of sections in which information can be presented to the user of the electronic device 200. For example, as shown in FIG. 3, the display area 302 comprises a background section displaying the current time/date and background image, while a bottom right hand corner section displays a menu through which a user scan scroll for purposes of navigating to/from features/functions of the electronic calendar 200. The features can include, but are not limited to, an alarm, an electronic calendar, and a photo gallery. Accordingly, the functions can include, but are not limited to, setting a clock, setting an alarm, turning an alarm on/off, adding/modifying/deleting appointments from a calendar, scrolling through digital images, organizing digital images, adding/modifying/deleting digital images from a photo gallery, and/or selecting a digital image as a background image of the electronic device's main screen and/or calendar. The present invention is not limited to the particularities of this example.

Accordingly, in other scenarios, a top left portion of the display area is used to present first information to the user. A top right portion of the display area is used to present second information to the user. A bottom portion of the display area is used to present third information to the user. The first, second and third information can be of the same or different types. For the sake of discussion, the first information comprises a calendar showing scheduled appointments at certain times of a particular day of the year. The second information specifies details relating to at least one of the scheduled appointments (e.g., a call in number, a passcode, and attendee names). The third information comprises a tool bar and/or menus for allowing the user to control operations of the electronic device. Advertisements may also be presented in the display area.

Figure 23:
FIGS. 23-26 each provide a schematic illustration of an exemplary display area architecture for an electronic device implementing the present invention.
Figure 24:
Figure 25:
Figure 26:

In yet other scenarios, the display area can comprise only two display areas at any given time, namely left/right display areas (e.g., as shown in FIGS. 23-24) or top/bottom display areas (e.g., as shown in FIGS. 25-26).

Figure 4:

An exemplary process for controlling the electronic device 200 will now be described in relation to FIGS. 3-16. In FIG. 3, a user of the electronic device 200 touches the display 228 so as to select a menu item entitled "set alarm". In effect, the user is presented with widgets for setting or editing an alarm, as shown in FIG. 4. Once the parameters for the alarm are selected by the user, the user performs a user-software interaction for saving the parameters. The user-software interaction can be achieved using a virtual button entitled "save".

Figure 5:
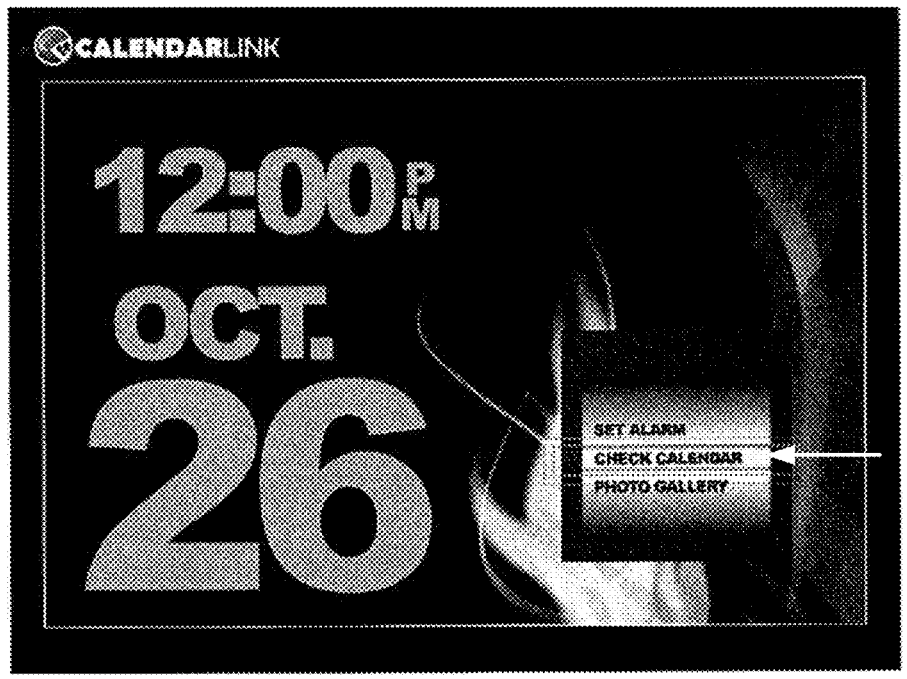
Figure 6:

Referring now to FIGS. 5-6, a user of the electronic device 200 can perform operations to check a calendar. In this regard, the user can perform user-software interactions to check the calendar, such as by selecting a menu option 500 entitled "check calendar". In response to this user selection, an electronic calendar 600 is presented to the user. The electronic calendar 600 includes a plurality of indicators indicating various calendar-related information. For example, an update box can indicate whether or not other users have made any changes to the calendar that still need to be reviewed by the user. First colored boxes of the calendar indicate that passed events were scheduled on a particular day. Second colored boxes of the calendar indicate the current day of the year. Third colored boxes indicate that a number of events have already been scheduled on a given day. The user may select any day to review, add or delate calendaring-related information associated therewith.

Figure 7:

Referring now to FIG. 7, the electronic device 200 displays a list of names 700 identifying people who have scheduled events on the same day. The user of the electronic device 200 can select an appropriate calendar for editing the contents thereof simply by selecting the corresponding name (e.g., dad) contained in the list.

Figure 8:
Figure 9:
Figure 10:
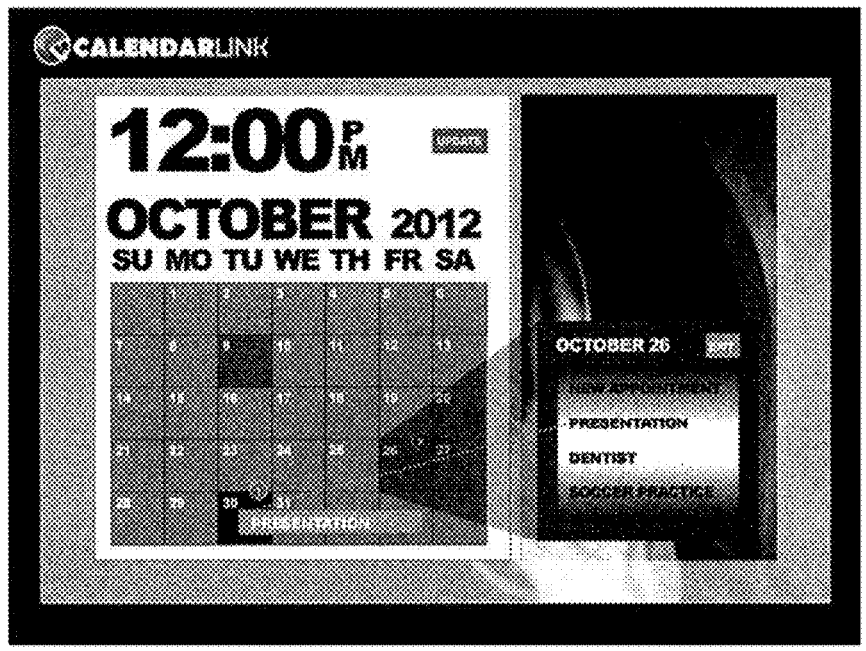

Referring now to FIGS. 8-10, the electronic device 200 displays a list of event titles 800 identifying types of events that can be scheduled. The user can schedule an event of a particular type (e.g., a presentation) simply by selecting a corresponding event title (e.g., "presentation") contained in the list, and set parameters (e.g., time and day) therefore using virtual widgets 900. The selected parameters for the event can then be saved using a virtual "save" button 902. Once an event has been saved, the user can change the parameters thereof simply by dragging and dropping the event identifier to another day, as shown in FIG. 10. An indicator can be provided in conjunction with the event and/or old/new day indicating that an event change has occurred. This indicator can include, but is not limited to, a red circle.

Figure 11:

Referring now to FIG. 11, a user of the electronic device 200 has the option to delete a scheduled event/appointment. The deletion is achieved using a virtual "delete" button 1100 accessible via a scrolling menu specifying a number of events/appointments scheduled on a user-selected day.

Figure 12:
Figure 13:

Referring now to FIGS. 12-13, the user of the electronic device 200 can add an event and give a custom label thereto by inputting a keypad or voice recording. The user of the electronic device 200 also has the option to cause an event to repeat a plurality of times (e.g., once, daily, weekly, monthly, yearly, etc. . . . ). The electronic device 200 stores reoccurring events and creates a smart tab so the user does not have to re-enter the same name every time.

Figure 14:
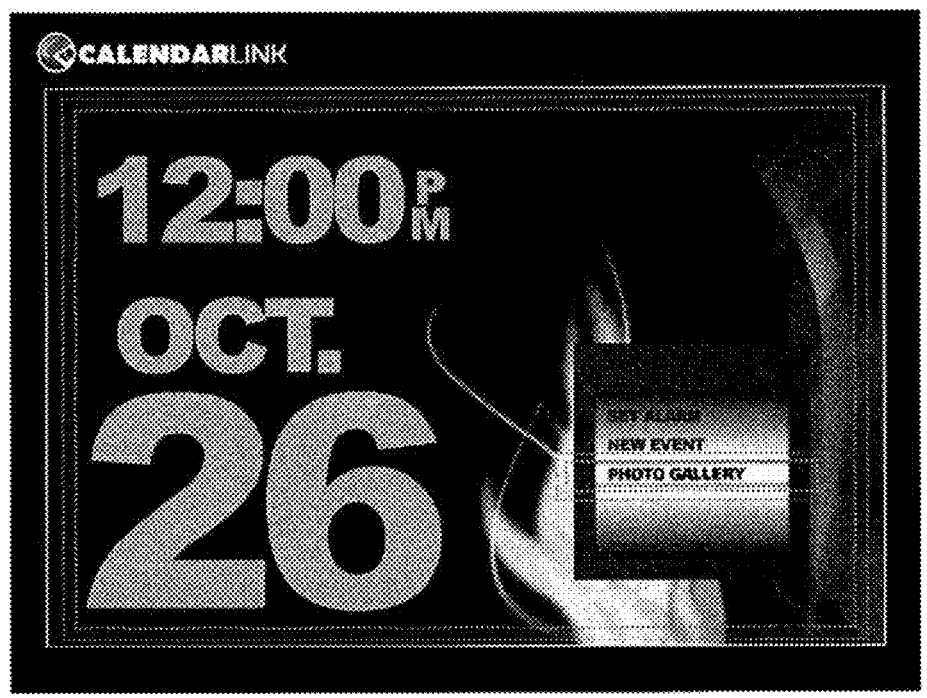
Figure 15:
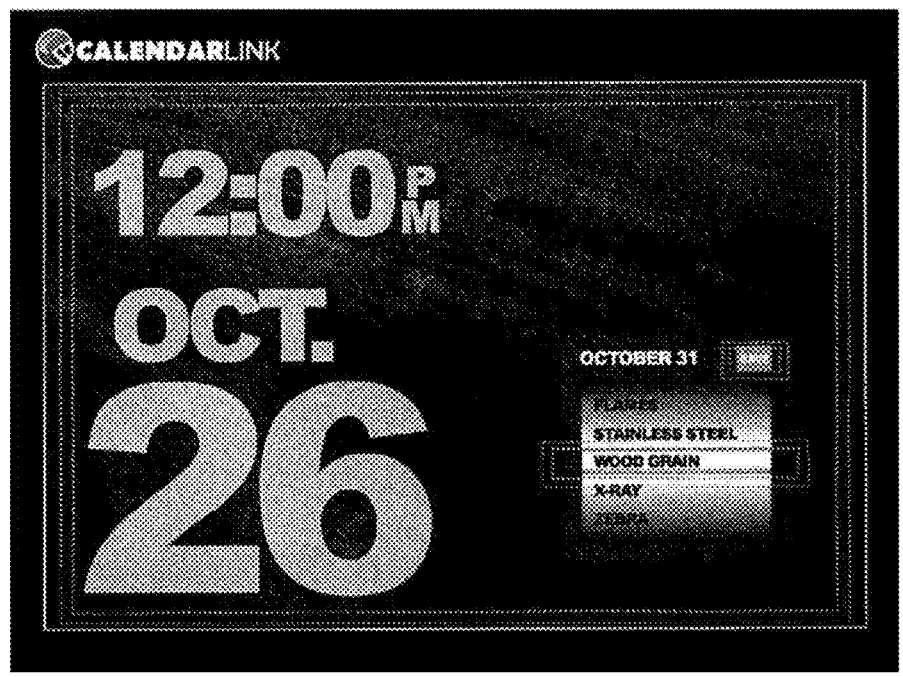
Figure 16:
Figure 17:
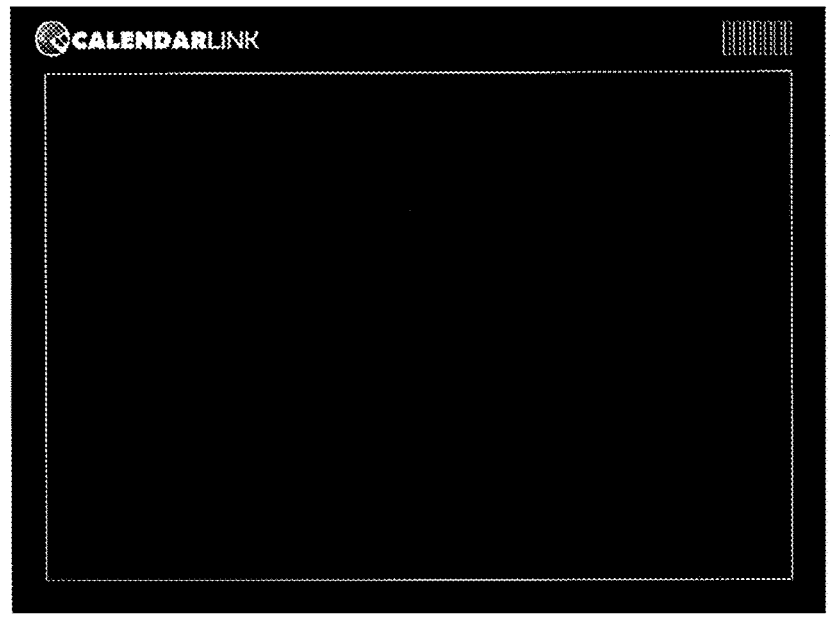
FIG. 17 is a front view of an exemplary architecture for an electronic device implementing the present invention.
Figure 18:
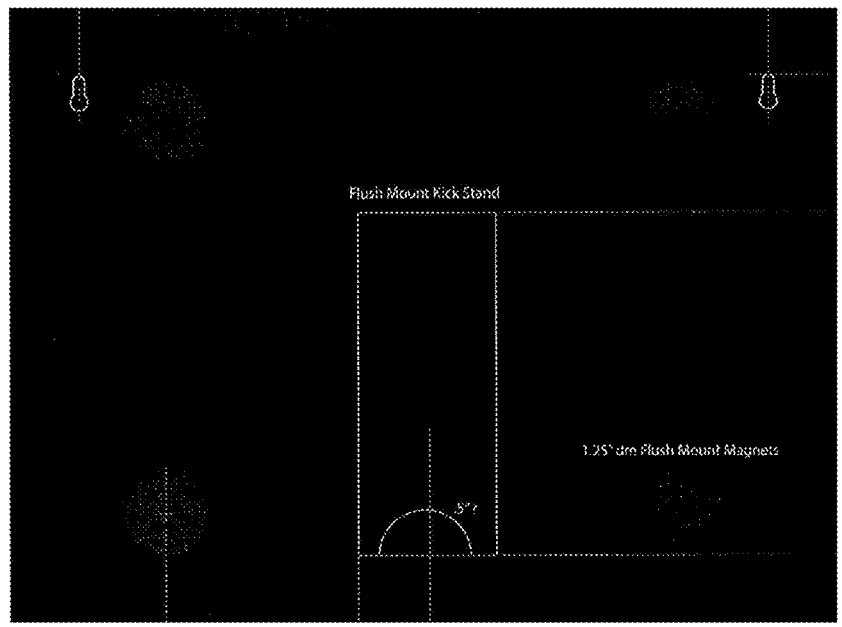
FIG. 18 is a rear view of the electronic device shown in FIG. 17.

Referring now to FIGS. 14-16, the user of the electronic device 200 has the option to change a background image to an image stored in a photo gallery. In this regard, the user can select from pre-installed images or sync images that have been uploaded to a website or taken with a camera of the electronic device 200. Additionally or alternatively, the user can select from personally uploaded images via a USD, website or mobile device.

In view of the forgoing, the present invention provides implementing systems and methods for providing a composite electronic calendar, alarm clock, appointment holder, and picture display. The present invention may be implemented in hardware and/or software. The software implementation allows the present invention to accessible via a stationary electronic device, a handheld device, a personal computer and/or a website. Various calendars can be imported and exported to the system such that a user can view the same in accordance with his(her) preferences and/or have his(her) personal calendar auto-populated with select events contained in the imported calendars. The imported calendars can include, but are not limited to, school calendars, event calendars, sport calendars, venue calendars and other personal calendars. A fee may be charged for importing/exporting a calendar.

Figure 27:
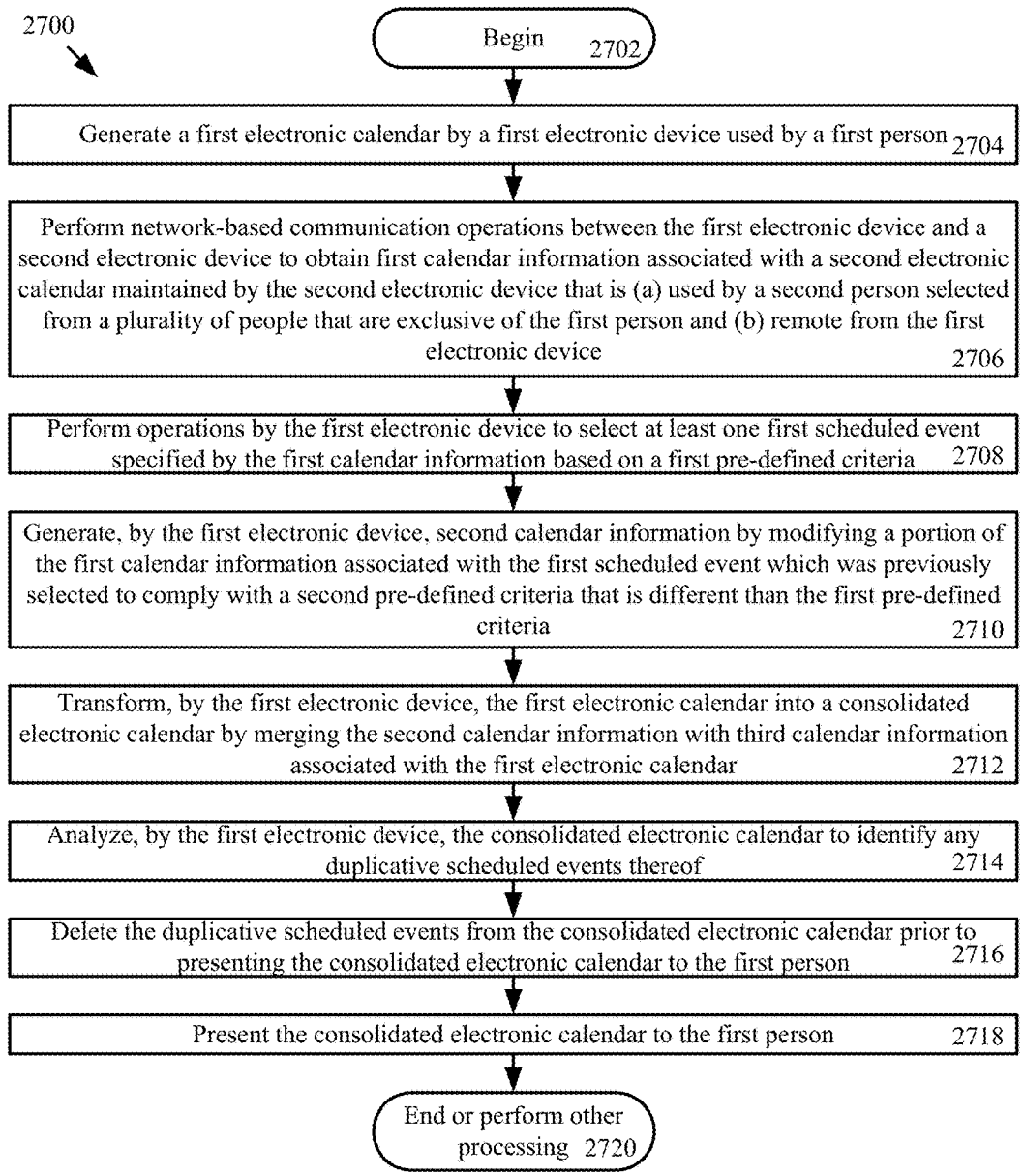
FIG. 27 is a flow diagram of an exemplary method for providing an electronic calendar.

Referring now FIG. 27, there is provided a flow diagram of an exemplary method 2700 for providing an electronic calendar (e.g., electronic calendar 600 of FIG. 6) through network-based communications between at least two network nodes (e.g., electronic devices 102-106 of FIG. 1). The method 2700 begins with step 2702 and continues with step 2704 in which a first electronic calendar (e.g., electronic calendar 600 of FIG. 6) is generated by a first electronic device (e.g., electronic device 102 of FIG. 1) used by a first person. In a next step 2706, network-based communication operations are performed between the first electronic device (e.g., electronic device 102 of FIG. 1) and a second electronic device (e.g., electronic device 104 of FIG. 1) to obtain first calendar information associated with a second electronic calendar maintained by the second electronic device. The second electronic device is (a) used by a second person selected from a plurality of people that are exclusive of the first person and (b) remote from the first electronic device. Network-based operations are well known in the art for communicating data between two network nodes. Any known or to be known technique for achieved such network-based communications can be used herein without limitation.

Once the first calendar information has been obtained, the first electronic device performs operations in step 2708 to select at least one first scheduled event specified by the first calendar information based on first pre-defined criteria. The first pre-defined criteria can include, but is not limited to, a team name, a group name, a grade level, an instructors name, a class name, an entity name, a location name, a person's name, a meeting name or topic, a presentation name or topic, a phone number, a date range, a time range, an event name, an event type, and/or a person's appointment history.

In a next step 2710, the first electronic device generates second calendar information by modifying a portion of the first calendar information associated with the first scheduled event which was previously selected to comply with second pre-defined criteria that is different than the first pre-defined criteria. The second pre-defined criteria can include, but is not limited to, user's preferences for viewing the first electronic calendar. The second calendar information is then used to transform the first electronic calendar into a consolidated electronic calendar, as shown by step 2712. This transformation is achieved by merging the second calendar information with third calendar information associated with the first electronic calendar.

The consolidated electronic calendar is then analyzed by the first electronic device in step 2714 to identify any duplicative scheduled events thereof. The duplicative scheduled events are deleted from the consolidated electronic calendar prior to presenting the consolidated electronic calendar to the first person, as shown by steps 2716-2718. Subsequent to presenting the first electronic calendar to the first person, step 2720 is performed where method 2700 ends or other processing is performed.

Notably, in some scenarios, steps 2706-2718 are iteratively performed. For example, a second iteration of the network-based communication operations if step 2706, the selecting of step 2708, the generating of step 2710 and the transforming 2712 is performed by the first electronic device in response to an occurrence of a trigger event. The trigger event can include, but is not limited to, an expiration of a time period, an occurrence of a particular scheduled event contained in the consolidated electronic calendar, or a modification of the consolidated electronic calendar in accordance with content of a third electronic calendar maintained by a third electronic device. The third electronic device is used by a third person other than the first and second person. Each of the first, second and/or third electronic calendars can be a personal calendar and/or a business entity's calendar (e.g., a movie theater's calendar or a sport arena's calendar).

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

I claim:

1. A method for providing an electronic calendar through network-based communications between at least two network nodes, comprising:
    generating a first electronic calendar by a first electronic device used by a first person; and
    auto-populating said first electronic calendar with select events contained in network calendars imported according to the following steps:
    performing network-based communication operations between the first electronic device and a second electronic device on the same network to extract from said second electronic device first calendar information associated with a second electronic calendar maintained by the second electronic device that is (a) an internet-based school calendar, sports calendar or venue calendar or an electronic device used by a second person selected from a plurality of people that are exclusive of the first person and (b) remote from the first electronic device;
    evaluating, by said first electronic device, said extracted first calendar information, for one or more first scheduled events from said second electronic calendar that meet a first pre-defined criteria, for inclusion on said first electronic calendar;
    selecting, by the first electronic device, any first scheduled event specified by the first calendar information meeting said first pre-defined criteria;
    generating, by the first electronic device when a first scheduled event is selected, second calendar information by modifying a portion of the first calendar information associated with the first scheduled event which was previously selected to comply with a second pre-defined criteria that is different than the first pre-defined criteria; and
    transforming, by the first electronic device, the first electronic calendar into a consolidated electronic calendar by merging the second calendar information with third calendar information associated with the first electronic calendar;
    wherein the first pre-defined criteria comprises at least one of a team name, a group name, a grade level, an instructors name, a class name, an entity name, a location name, a person's name, a meeting name or topic, a presentation name or topic, a phone number, a date range, a time range, an event name, an event type, and a person's appointment history.

2. The method according to claim 1, wherein the second pre-defined criteria comprises the user's preferences for viewing the first electronic calendar.

3. The method according to claim 1, wherein a second iteration of the network-based communication operations, selecting, generating and transforming is performed by the first electronic device in response to an occurrence of a trigger event.

4. The method according to claim 3, wherein the trigger event comprises an occurrence of a scheduled event contained in the consolidated electronic calendar or a modification of the consolidated electronic calendar in accordance with content of a third electronic calendar maintained by a third electronic device.

5. The method according to claim 1, wherein the portion of the first calendar information is modified so that an alarm issued a certain amount of time prior to the occurrence of the first scheduled event is different than an alarm issued a certain amount of time prior to a second scheduled event specified on the first electronic calendar.

6. The method according to claim 1, further comprising:
    analyzing, by the first electronic device, the consolidated electronic calendar to identify any duplicative scheduled events thereof; and
    deleting the duplicative scheduled events from the consolidated electronic calendar prior to presenting the consolidated electronic calendar to the first person.

7. The method according to claim 1, further comprising automatically changing content displayed on the first electronic calendar in response to a trigger event.

8. The method according to claim 7, wherein the trigger event comprises a modification of a scheduled event on the second electronic calendar or an expiration of a time period.

9. The method according to claim 1, wherein the merging comprises adding the first scheduled event to the first electronic calendar.

10. A system, comprising:
    a network; and
    a plurality of electronic devices operative to perform network-based communication operations for exchanging data therebetween over said network;
    wherein a first electronic device of the plurality of electronic devices is configured to
        generate a first electronic calendar for a first person and import other network calendars to auto-populate the first electronic calendar with select events contained in the other network calendars,
        extract from a second electronic device first calendar information associated with a second electronic calendar maintained by said second electronic device of the plurality of electronic devices that is (a) an internet-based school calendar, sports calendar or venue calendar or used by a second person selected from a plurality of people that are exclusive of the first person and (b) remote from the first electronic device,
        evaluate said extracted first calendar information, for one or more first scheduled events from said second electronic calendar that meet a first pre-defined criteria, for inclusion on said first electronic calendar;
        select any first scheduled event specified by the first calendar information meeting said first pre-defined criteria,
        generate, when a first calendar event is selected, second calendar information by modifying a portion of the first calendar information associated with the first scheduled event which was previously selected to comply with a second pre-defined criteria that is different than the first pre-defined criteria, and transform the first electronic calendar into a consolidated electronic calendar by merging the second calendar information with third calendar information associated with the first electronic calendar;

wherein the first pre-defined criteria comprises at least one of a team name, a group name, a grade level, an instructors name, a class name, an entity name, a location name, a person's name, a meeting name or topic, a presentation name or topic, a phone number, a date range, a time range, an event name, an event type, and a person's appointment history.

11. The system according to claim 10, wherein the second pre-defined criteria comprises the user's preferences for viewing the first electronic calendar.

12. The system according to claim 10, wherein the first electronic device generates a new consolidated calendar in response to an occurrence of a trigger event.

13. The method according to claim 12, wherein the trigger event comprises an occurrence of a scheduled event contained in the consolidated electronic calendar or a modification of the consolidated electronic calendar in accordance with content of a third electronic calendar maintained by a third electronic device.

14. The system according to claim 10, wherein the portion of the first calendar information is modified so that an alarm issued a certain amount of time prior to the occurrence of the first scheduled event is different than an alarm issued a certain amount of time prior to a second scheduled event specified on the first electronic calendar.

15. The system according to claim 10, wherein the first electronic device is further:

analyzes the consolidated electronic calendar to identify any duplicative scheduled events thereof; and deletes the duplicative scheduled events from the consolidated electronic calendar prior to presenting the consolidated electronic calendar to the first person.

16. The system according to claim 10, wherein the first electronic device further automatically changes content displayed on the first electronic calendar in response to a trigger event.

17. The system according to claim 16, wherein the trigger event comprises a modification of a scheduled event on the second electronic calendar or an expiration of a time period.

18. The system according to claim 10, wherein the merging comprises adding the first scheduled event to the first electronic calendar.

19. The method according to claim 1, wherein the second electronic calendar is an internet-based school calendar, sports calendar or venue calendar.

20. The system according to claim 10, wherein the second electronic calendar is an internet-based school calendar, sports calendar or venue calendar.

* * * * *